(12) United States Patent
Bayer et al.

(10) Patent No.: US 7,473,755 B2
(45) Date of Patent: Jan. 6, 2009

(54) AROMATIC POLYESTER COMPOSITION FOR MAKING STRETCH BLOW MOLDED CONTAINERS

(75) Inventors: Uwe Bayer, Gessertshausen (DE); Thomas Wehrmeister, Rüsselsheim (DE); Cor Jansen, Rijen (NL); Hilde Krikor, Deurne (BE); Steve Windelinckx, Zoersel (BE)

(73) Assignee: Invista North America S.ar.l., Wilmington, DE (US)

( * ) Notice: Subject to any disclaimer, the term of this patent is extended or adjusted under 35 U.S.C. 154(b) by 252 days.

(21) Appl. No.: 10/583,806

(22) PCT Filed: Dec. 14, 2004

(86) PCT No.: PCT/EP2004/014225

§ 371 (c)(1),
(2), (4) Date: Jun. 22, 2006

(87) PCT Pub. No.: WO2005/063846

PCT Pub. Date: Jul. 14, 2005

(65) Prior Publication Data

US 2007/0149754 A1    Jun. 28, 2007

(30) Foreign Application Priority Data

Dec. 22, 2003  (EP) .................... 03029269
Feb. 7, 2004   (EP) .................... 04002752

(51) Int. Cl.
*C08G 63/02* (2006.01)
*C08G 63/00* (2006.01)

(52) U.S. Cl. .............. 528/272; 264/176.1; 264/219; 428/35.7; 428/411.1; 428/412; 502/150; 528/271; 528/272

(58) Field of Classification Search ........... 264/176.1, 264/219; 428/35.7, 411.1, 412; 502/150; 528/271, 272

See application file for complete search history.

(56) References Cited

U.S. PATENT DOCUMENTS

| 4,002,667 A | 1/1977 | Thompson |
| 4,209,606 A | 6/1980 | Ciaperoni et al. |
| 4,499,262 A | 2/1985 | Fagerburg et al. |
| 4,579,936 A * | 4/1986 | O'Neill ............ 528/295 |
| 5,399,595 A | 3/1995 | Sublett et al. |
| 5,438,878 A * | 8/1995 | Carroll, Jr. ............ 73/788 |
| 5,608,032 A * | 3/1997 | Yuo et al. ............ 528/286 |

FOREIGN PATENT DOCUMENTS

| EP | 0 909 774 A1 | 4/1999 |
| JP | 59093723 | 5/1984 |
| JP | 06-099475 | 4/1994 |

OTHER PUBLICATIONS

Database WPI, Section Ch, Week 199419; Derwent Publications Ltd., London, GB—, AN 1994-156262; XP002271123.

* cited by examiner

*Primary Examiner*—Terressa M Boykin

(57) ABSTRACT

The present invention relates to an aromatic polyester composition for making stretch blow molded containers with improved strain hardening. The polyester composition according to the invention exhibits a low DEG content, a natural stretch ratio of <10, a half time of crystallization of >150 sec at 200° C. and comprises a sulfo-modified copolymer. Compared to polyesters of the prior art, the polyester of the present invention exhibits superior stretching characteristics, such as a lower natural stretch ratio (NSR), which allows for production of small PET bottles via thinner and longer parisons. Such thinner and longer parisons improve the production of small containers due to shorter cooling cycles.

19 Claims, No Drawings

AROMATIC POLYESTER COMPOSITION FOR MAKING STRETCH BLOW MOLDED CONTAINERS

The present invention relates to an aromatic polyester composition for making biaxially stretched containers, especially stretch blow molded containers, with improved strain hardening. The polyester composition according to the invention comprises a sulfo-modified copolymer with a low DEG content. The polyester composition according to the invention is specifically adapted for containers especially with a low planar stretch ratio, and more especially for small volume containers. Compared to polyesters of the prior art, the polyester of the present invention exhibits superior stretching characteristics, such as a lower natural stretch ratio (NSR), which allows notably for production of small PET bottles via thinner and longer parisons. Such thinner and longer parisons improve the production of containers.

BACKGROUND OF THE INVENTION

Polyethylene terephthalate (PET) polymers are widely used in the packaging industry. PET has excellent mechanical properties as well as optical properties such as high transparency and a high barrier.

Meanwhile, biaxially oriented containers, e.g. bottles, made from PET are widely accepted by customers of the beverage industry. Common sizes for PET bottles range from 0.75 l to 2 l (common US sizes are 20 fl. oz. and 24 fl. oz.). Recently smaller beverage bottles (below 1 l, especially 0.6 l and below) have enjoyed increasing popularity. Such smaller bottles were manufactured from the same PET as the larger bottles, simply by using shorter and thicker parisons. Yet, there are disadvantages associated with the use of the same PET as for larger bottles and just miniaturized parisons.

For the production of beverage bottles, it is important that the polymer is well oriented during stretch-blow molding. Proper orientation results in uniform material distribution in most areas of the bottle and in good physical properties like gas barrier. In particular the production of small bottles with known commercial PET needs short parisons with a thick sidewall. This parison design is necessary in order to achieve the proper orientation of standard PET. A proper orientation means that the area stretch ratio which corresponds to the ratio of a given (marked) area on the stretched bottle (called: bubble) surface to the corresponding area on the surface of the unstretched parison should be about 12.5. In the field of bottle making this area stretch ratio is called 'natural stretch ratio' (NSR).

The NSR can be determined in a free-blowing experiment. Free-blowing of thermoplastics, in particular PET and PET copolymers, is a well known technique used to obtain empirical data on the stretching behavior of a particular resin formulation. The method of free blowing PET parisons is described in "Blow Molding Handbook", edited by Donald V. Rosato, Dominick V. Rosato, Munich 1989. The term "free-blowing" means that a parison is blow-molded without using a mold. Free-blowing a bottle from a parison involves heating the parison to a temperature above its glass transition temperature and then expanding the parison outside of a mold so that it is free to expand without restriction until the onset of strain hardening. Strain hardening can be detected in a stress-strain curve as an upswing in stress following the flow plateau. To a large extent the strain hardening is associated with molecular ordering processes in the resin. Parameters, which exhibit a strong influence on the onset of strain hardening, are molecular weight, the rate of deformation, temperature of the parison and the amount of modifier. If the blow pressure and heating of the parison is properly set for a given parison, it will continue to expand until all of the PET is oriented to the point that stretching will stop at about the natural stretch ratio, or slightly beyond. The outer marked area of the bubble can be converted to a stretch ratio by dividing this marked area by the corresponding outer marked area of the parison.

During injection molding some reduction of the intrinsic viscosity (IV) occurs, and as a consequence the determined NSR is higher, compared to the NSR with no IV reduction. For better comparison of resin properties, the NSR can be calculated for each resin composition. This avoids the influence of process conditions of injection molding on the determined NSR value.

The disadvantage of using known commercial PET in a parison design with a thick sidewall is that a long cooling time is required during injection molding in order to avoid crystallization. A further reduction in size of the parison is limited by the sidewall thickness. If the sidewall thickness is too large, crystallization cannot be prevented during cooling after injection molding.

Thus, in order to avoiding crystallization during injection molding and to improve the strain hardening of known commercial PET, one skilled in the art would probably either add a modifier to the PET or—if already present—try to adjust the amounts of such modifiers. However, common modifiers such as isophthalic acid (IPA), cyclohexanedimethanol (CHDM) or diethylene glycol (DEG) tend to shift the onset of strain hardening to higher stretch values which corresponds to an increase in the NSR, which is disadvantageous. The only commonly known way to reduce the NSR is by way of increasing the molecular weight (i.e. the intrinsic viscosity [IV]) of the PET. Yet, the molecular weight cannot be increased to an extent that would offset the negative influence of the modifier and at the same time decrease the NSR to a sufficiently low value.

A further problem associated with common commercial bottle resins is the high DEG content. The high DEG level in common commercial PET helps to prevent crystallization; on the other hand, the high DEG level makes it impossible to manufacture economically small size polyester bottles for various reasons.

Yet another problem in the manufacture of PET bottles is the crystallization rate of the resin. If the crystallization rate is too high, the process window becomes too narrow. An economic manufacture of small bottles requires, that the crystallization rate is slow. However, some known common commercial polyesters have too high crystallization rates.

Thus, there is still a need for an improved PET resin that is specifically adapted for making containers, and in particular bottles.

PRIOR ART

Some modified polyester compositions are known.

U.S. Pat. No. 4,499,262 describes a process for the preparation of sulfo-modified polyesters. However, this document does not disclose how to reduce DEG formation during the preparation of the polyester. Quite contrary U.S. Pat. No. 4,499,262 teaches DEG as an optional glycol component of the polyester. The NSR of this polyester is too high.

U.S. Pat. No. 4,579,936 discloses an ethylene terephthalate copolymer with an alicyclic sulfonate as co-monomer. It mentions that aromatic sulfo-monomers yield in high diethylene glycol content and that such DEG formation can only be controlled by the addition of sodium acetate. According to U.S. Pat. No. 4,579,936 the use of alicyclic sulfonate monomers do not yield in as high a DEG formation as with aromatic sulfo-monomers. U.S. Pat. No. 4,579,936 does not mention the addition of Na$_2$HPO$_4$ during polymer production. Moreover, the NSR of the polyester of Example 4 of U.S. Pat. No. 4,579,936 was determined to be about 12, which is too high to solve the problem upon which the present invention is based.

JP 06-099475 discloses a sulfo-modified polyester for use in direct blow molding for bottles and containers. Tetramethylammonium hydroxide (TMAH) is disclosed as an additive. Yet, DEG formation during the polyester manufacture is still too high. JP 06-099475 does not mention the addition of Na$_2$HPO$_4$ during polymer production.

U.S. Pat. No. 5,399,595 disclose a sulfo-modified polyester with a high melt viscosity, high melt strength and a high NSR, and which can be foamed with a wide range of foaming agents. The content of DEG in the polyester is not disclosed. U.S. Pat. No. 5,399,595 does not mention the addition of Na$_2$HPO$_4$ during polymer production.

EP-A-0 909 774 discloses the use of phosphates like Na$_2$HPO$_4$ for further increase in reactivity. The increase in reactivity is disclosed for the preparation of polybutylene terephthalate and a catalyst composition based on Ti and/or Zr and a lanthanide series element or hafnium. There is no disclosure that the polyester may contain any sulfo-monomers nor of the DEG content of the polymers nor is there a disclosure how to reduce the amount of DEG formed during manufacture.

U.S. Pat. No. 4,002,667 disclose a process for the manufacture of bis-(2-hydroxyethyl)-terephthalate by reacting dimethyl terephthalate and ethylene glycol with a basic catalyst, e.g. dialkali hydrogen phosphate. The use of a basic catalyst improves the yield of bis-(2-hydroxyethyl)-terephthalate with minimal oligomer formation. There is no disclosure that the polyester may contain any sulfo-monomers nor of the DEG content of the polymers nor is there a disclosure how to reduce the amount of DEG formed during manufacture.

U.S. Pat. No. 5,608,032 discloses a catalyst composition for the polycondensation of terephthalic acid with ethylene glycol with antimony, a second metal salt catalyst and an alkali metal phosphate as co-catalyst. The catalyst composition increases the reaction rate and reduces the degree of yellowness of the polyethylene terephthalate. There is no disclosure that the polyester may contain any sulfo-monomers nor of the DEG content of the polymers nor is there a disclosure how to reduce the amount of DEG formed during manufacture.

Japanese patent application JP 59-093723 discloses a method for the production of polyester, wherein at least two compounds are added to the second stage of the polycondensation. The two added compounds are characterized in that an aqueous solution of these compounds forms a pH buffer at 18° C. There is no disclosure of the DEG content of the polymers nor is there a disclosure how to reduce the amount of DEG formed during manufacture. Quite contrary JP 59-093723 teaches DEG as an optional glycol component of the polyester. Example 1 of JP 59-093723 was reproduced with and without sodium dimethyl-5-sulfonatoisophthalate and with and without Na$_2$HPO$_4$. At best the NSR reached 10.9, which is still unsatisfactory. Thus, there is still a need for improvement both in the production of beverage bottles as well as in the properties of such bottles. It is, therefore, an object of the invention to provide a polyester composition that allows for economic manufacture polyester container, in particular containers having a low planar stretch ratio, and more particularly small size containers. It is an object of the invention to provide a polyester, which at the same time satisfies the following characteristics:

- low DEG content, i.e. <5 wt.-%, preferably <3 wt.-%, especially preferred <2.5 wt.-% (based on the weight of the polyester)
- natural stretch ratio (NSR) <10, preferably <9.6, especially preferred <9.3
- reduced thermal crystallization (the half time of crystallization at 200° C. is >150 sec, preferably >250 sec, especially preferred >300 sec).

The polyester composition according to the invention provides for thinner walled parisons for making containers, especially bottles.

BRIEF DESCRIPTION OF THE INVENTION

This object is achieved by a polyester comprising at least 85 Mol.-% of polyethylene terephthalate and at least 0.01 Mol.-% but not more than 5.00 Mol.-% of units of the formula (I)

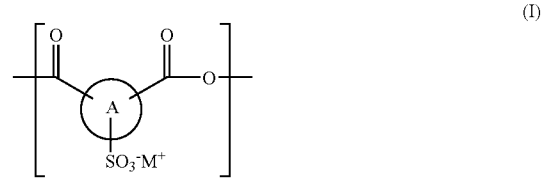

wherein

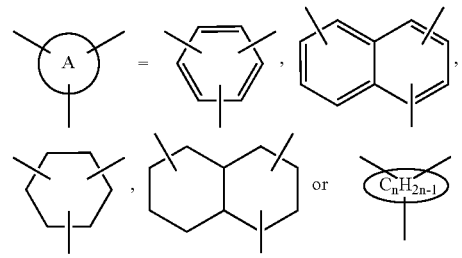

wherein n is an integer from 3 to 10 and wherein

M$^+$ is an alkali metal ion, earth alkali metal ion, phsphonium ion or ammonium ion and wherein the polyester contains <5.0 wt.-%, preferably <3.0 wt.-% and especially preferred <2.5 wt.-% of diethylene glycol and wherein the polyester contains Na$_2$HPO$_4$ in an amount such that the phosphor content is 10 to 200 ppm, preferably 10 to 150 ppm, especially preferred 10 to 100 ppm (based on the weight of the polyester) and wherein the polyester is either free of or does not contain more than 9 ppm preferably 5 ppm and especially preferred 3 ppm of NaH$_2$PO$_4$, and wherein the intrinsic viscosity is 0.6 to 1.0, preferably 0.7 to 0.9 and especially preferred 0.75 to 0.89.

DETAILED DESCRIPTION OF THE INVENTION

Preferably

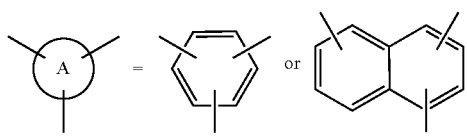

and especially preferred

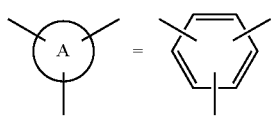

with the attachments preferably in the 1-, 3- and 5-position (for the phenyl ring) and in 2-,4- and 6-position (for the naphthyl ring).

Preferably $M^+$ is an alkali metal ion, especially preferred $Li^+$, $Na^+$ or $K^+$.

It was surprisingly found that $Na_2HPO_4$ in the above mentioned polyester leads to a significant reduction in the DEG content in the polymer compared to a mixture of $NaH_2PO_4$ and $Na_2HPO_4$ or to $NaH_2PO_4$ alone. It was also surprisingly found that $Na_2HPO_4$ leads also to a significant DEG reduction compared to the use of polyphosphoric acid. If the phosphor content in the polyester comprises more than 200 ppm, than the clarity of the polyester is not good. If the phosphor content in the polyester is less than 10 ppm, than the effect on the reduction of the DEG content is negligible.

Preferably the $Na_2HPO_4$ (disodium monohydrogenphosphate) is employed in the form of the hepta-hydrate (.7 $H_2O$), especially preferred as dodeca-hydrate (.12 $H_2O$). If it is employed e.g. in dehydrated form the $Na_2HPO_4$ is not soluble in glycol and therefore it is difficult to add to the reactor.

The polyester according the invention preferably also comprises organic acid salts containing an alkali metal cation and an anion derived from lower-aliphatic carboxylic acids. Examples of suitable salts include the lithium, sodium and potassium salts of acetic acid. Preferred salts are sodium acetate and lithium acetate. The amount of organic salts in the polyester is greater than 10 ppm.

Preferably the polyester comprises at least 0.01 Mol-%, but not more than 3.00 Mol-%, and especially preferred at least 0.01 Mol-%, but not more than 1.50 Mol-% of units of the formula (I). If the polyester comprises less than 0.01 Mol-% of units of the formula (I) the targeted NSR is difficult to achieve, if it comprises more than 5.0 Mol-% the melt viscosity of the polymer is too high for economically injection molding.

The intrinsic viscosity ([IV]) is calculated from the specific viscosity according to the formula [IV]=0.0006907×{specific viscosity×1000}+0.063096. The specific viscosity is measured in dichloroacetic acid in 0.01 g/ml solution, at 25° C.

If the intrinsic viscosity is below 0.6 the targeted NSR is difficult to achieve, if it is above 1.0 the melt viscosity is too high for injection molding.

The IV given above is the IV of the resin. It should however be noted that the measured IV of a preform or containers and in particular bottles is usually below the IV of the polyester resin because IV degradation occurs during injection molding process. The IV of the resin can however be recalculated from the IV of the preform or bottle by simply taking into account the IV degradation that occurred during bottle manufacture.

If the DEG content is above 5.0 wt-% the target NSR is difficult to achieve.

It is preferred that the half time of crystallization at 200° C. of the polyester according to the present invention is >150 sec, more preferably >250 sec, especially preferred >300 sec. If the crystallization rate is below 150 sec at 200° C. the process window will become very narrow such that the stretched bottles become hazy.

It should however be noted that the measured half time of crystallization of a preform or containers and in particular bottles is usually below the half time of crystallization of the polyester resin because IV degradation occurs during injection molding process. The lower the IV the shorter the half time of crystallization. The half time of crystallization of the resin can however be recalculated from the half time of crystallization of the preform or bottle by simply taking into account the IV degradation that occurred during bottle manufacture.

The polyester according to the invention comprises at least 85 Mol.-% of polyethylene terephthalate and at least 0.01 Mol.-% but not more than 5.00 Mol.-% of units of the formula (I). The remaining molar amount of 0.0 Mol.-% to not more than 10 Mol.-% are modifying agents which have no negative influence on the DEG content and/or NSR and/or crystallization rate. Useful modifying agents are reheat agents like carbon black, graphite, or dark pigments; fillers; chain branching agents; antibloc agents; crystallization retarding agents; barrier improving agents; colorants, all of which are known to those skilled in the art. Preferred crystallization retarding agents are isophthalic acid, 1,4-cyclohexanedimethanol; the cyclo-aliphatic diol can be employed in the cis or trans configuration or as mixtures of both forms. Preferred colorants are Polysynthren® Blau RLS und RBL (Clariant, Pigments & Additives Division, Sulzbach am Taunus, Germany), Makrolex® Rot 5B (Bayer Chemicals AG, Leverkusen, Germany) and the like. Preferred barrier improving agents are 2,6-naphthalenedi-caboxylic acid; isophthalic acid, 4,4'-bibenzoic acid; 3,4'-bibenzoic acid or their halide or anhydride equivalent or the corresponding ester, and the like; and polyamides like MXD6® (Mitsubishi Gas Chemical Europe, Düsseldorf, Germany) or oxygen scavengers like Amosorb® (BP, Sunbury on Thames, United Kingdom).

The new sulfo-modified resin allows the design of longer and thinner parisons than those known in the art. The onset of strain hardening in the new resin is earlier and smaller bottles can be formed (compared to a standard resin) in the free-blowing experiment, based on the same parison design. Thus, lower natural stretch ratios (below 12.5, preferably of 10 or lower) are achieved yielding in excellent bottle properties like creep behaviour, topload, burst pressure and barrier performance.

The polyester according to the present invention is made by reacting
- a diacid or diester component comprising at least 85 mole percent terephthalic acid (TA) or $C_1$-$C_4$ dialkyl terephthalate with
- a diol component comprising at least 85 mole percent ethylene glycol (EG) and with
- at least 0.01 but not more than 5.00 Mol.-% of a compound according to formula (II):

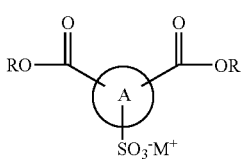

(II)

wherein R is hydrogen, a $C_1$-$C_4$-alkyl or a $C_1$-$C_4$-hydroxyalkyl and $M^+$ and

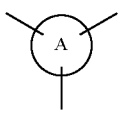

have the meaning given above in formula (I). It is preferred that the diacid component be TA (in this case the process is called PTA process or PTA route), or the dialkyl terephthalate component be dimethyl terephthalate (DMT) (in this case the process is called DMT process or DMT route), and R in the compound according to formula (II) is hydrogen, methyl or hydroxyethylene. The mole percentage for all the diacids/dialkyl acid components total 100 mole percent, and the mole percentage for all the diol components total 100 mole percent.

Preferred production of the polyethylene terephthalate (PET) according to the invention comprises reacting terephthalic acid (TA) (or dimethyl terephthalate—DMT) and a compound according to formula (II) with ethylene glycol (EG) at a temperature of approximately 200 to 290° C. forming monomer and water (100 to 230° C. forming monomer and methanol, when using DMT). Because the reaction is reversible, the water (or methanol) is continuously removed, thereby driving the reaction to the production of monomer. The monomer comprises primarily the bishydroxyethyl ester of the employed acids/methyl esters, some monohydroxyethyl ester, and other oligomeric products and perhaps small amounts of unreacted raw materials. During the reaction of TA, formula-(II)-compound and EG it is not necessary to have a catalyst present. During the reaction of DMT, formula-(II)-compound and EG it is recommended to use an ester interchange catalyst. Suitable ester interchange catalysts are compounds of Groups Ia (e.g. Li, Na, K), IIa (e.g. Mg, Ca), IIb (e.g. Zn), IVb (e.g. Ge), VIIa (e.g. Mn) and VIII (e.g. Co) of the Periodic Table, e.g. the salts of these with organic acids. Preference is given to those ester interchange catalysts which exhibit some solubility in the reaction mixture. Preferred are salts of: Mn, Zn, Ca, or Mg, in particular manganese, with lower-aliphatic carboxylic acids, in particular with acetic acid.

The amount of Mn, Zn, Mg or other transesterification catalysts employed in the present invention is preferably from about 15 to about 150 ppm metal based on the PET polymer. Suitable cobalt compounds for use with the present invention include cobalt acetate, cobalt carbonate, cobalt octoate and cobalt stearate. The amount of Co employed in the present invention is from about 10 to about 120 ppm Co based on the PET polymer. This amount is sufficient to balance any yellowness that may be present in the PET based polymer.

Subsequently, the bishydroxyethyl ester and monohydroxyethyl ester undergo a polycondensation reaction to form the polymer. Suitable catalysts for the polycondensation are compounds of antimony (e.g. $Sb(ac)_3$, $Sb_2O_3$), germanium (e.g. $GeO_2$) and Ti (e.g. $Ti(OR)_4$, $TiO_2/SiO_2$, sodium titanate). Preferred polycondensation catalysts are the antimony compounds.

The above catalysts may be added at any time during the polymerisation. Polymerization and polymerizing, with respect to the present invention, shall mean the steps of forming the monomer and the subsequent polycondensation.

An essential aspect of the invention is the presence of $Na_2HPO_4$ in the polymer. While $Na_2HPO_4$ may be added at any time during polymerisation, it is preferably added after the end of the transesterification reaction (in case of the DMT route).

Other additives such as the modifying agents mentioned above may optionally be incorporated into the molten polymer, or can be incorporated with the raw materials, or at any time during polymerisation as is known to those skilled in the art.

The process for the manufacture of the polymer according to the invention may be performed either batch-wise or continuously.

The intrinsic viscosity at the end of polymerisation is generally between 0.48 and 0.65 dl/g. It can be increased to values greater than 0.6 dl/g by means of solid state polycondensation (SSP) of the resin at temperatures generally between 180° C. and 240° C.

The invention will now be illustrated by the following non-limiting examples.

Measurement Methods

Half Time of Crystallization

The half-time of crystallization is determined with a differential scanning calorimeter apparatus, DSC (TA Instruments DSC 2910; with cooling unit (nitrogen flow 6 to 8 l/hour); nitrogen flow of 40 to 50 ml/min for the measuring cell; software: TA Instruments "Advantage" Vers. 2.0).

The base line of the DSC instrument was calibrated by running at a heating rate of 10° C./minute, without any samples (even no reference sample) in the DSC, from 0° C. to 350° C. The cell constant of the DSC instrument was calibrated with high-purity indium. A mass of about 10 mg was used for each indium sample and the heating rate was 10° C./minute. The temperature scale was calibrated with indium, tin, lead and bismuth. A mass of about 10 mg was used for each metal at a heating rate of 10° C./minute. The melting point for each metal was determined by measuring the tangential value of the left side of the melting endotherm peak.

Each solid state polymerized material is dried at 160° C. for 24 hrs at a reduced pressure of 1 mbar before measuring the isothermal crystallization. About 5 to 10 mg of the sample is weighed into an aluminum pan and closed. As a reference sample, an empty, closed aluminum pan is used. The isothermal crystallization rate at 200° C. is measured by heating each sample from room temperature to 300° C. with a heating rate of 50° C./min. At 300° C. the sample was held for 5 minutes to ensure complete melting.

The DSC was then cooled as fast as possible to 200° C. (command: "jump to 200° C.") and the crystallization is monitored. After completion of the crystallization the exothermic crystallization peak is integrated. Integration across the exothermic peak was used to construct a plot of relative crystallinity vs. time. The integrated peak area is evaluated with the option "running integral" and on the y-axis the "area percent %" is plotted. The time ("half time of crystallization") for the 50% "area percent" value (or 50% of the relative crystallinity) is determined.

Intrinsic Viscosity

The determination of the intrinsic viscosity was determined on a 0.01 g/ml polymer solution in dichloroacetic acid.

Before dissolution of solid state polymerized material, the chips were pressed in a hydraulic press (pressure: 400 kN at 115° C. for about 1 minute; type: PW40® Weber, Remshalden-Grunbach, Germany). 480 to 500 mg polymer, either amorphous chips or pressed chips, were weighed on an analytical balance (Mettler AT 400®) and dichloroacetic acid is added (via Dosimat® 665 or 776 from Metrohm) in such an amount, that a final polymer concentration of 0.0100 g/ml is reached.

The polymer is dissolved under agitation (magnetic stirring bar, thermostat with set point of 65° C.; Variomag Thermomodul 40ST®) at 55° C. (internal temperature) for 2.0 hrs. After complete dissolution of the polymer, the solution is cooled down in an aluminum block for 10 to 15 minutes to 20° C. (thermostat with set point of 15° C.; Variomag Thermomodul 40ST®).

The viscosity measurement was performed with the micro Ubbelohde viscometer from Schott (type 53820/II; Ø: 0.70 mm) in the Schott AVS 500® apparatus. The bath temperature is hold at 25.00±0.050° C. (Schott Thermostat CK 101®). First the micro Ubbelohde viscometer is purged 4 times with pure dichloroacetic acid, then the pure dichloroacetic acid is equilibrated for 2 minutes. The flow time of the pure solvent is measured 3 times. The solvent is drawn off and the viscometer is purged with the polymer solution 4 times. Before measurement, the polymer solution is equilibrated for 2 minutes and then the flow time of this solution is measured 3 times.

The specific viscosity is calculated as $$\eta_{sp} = \left( \frac{\text{average flow time of polymer solution}}{\text{average flow time of dicloroacetic acid}} - 1 \right).$$

The intrinsic viscosity ([IV]) is calculated from the specific viscosity according to the formula $[IV]=0.0006907 \times (\eta_{sp} \times 1000) + 0.063096$.

Natural Stretch Ratio

Manufacture of a Parison:

A parison is made on an Arburg injection-molding machine (Allrounder® 420 C 800-250). The injection-molding machine is equipped with a screw of a diameter of 30 mm and a L/D ratio of 23.3. The Allrounder has 5 heating bands and the feed zone is 465 mm, the compression zone is 155 mm and the metering zone is 155 mm. Water is used as coolant with an inlet temperature <15° C. and an outlet temperature <20° C.

The description of the parison design follows the description in the "Blow Molding Handbook" (Munich 1989, p 552, FIG. 14.9). The parison weight is 28 g, the wall thickness is 4.0±0.1 mm, the inside diameter is 14.5±0.6 mm, the outside diameter is 22.5±0.5 mm, the overall length is 100.5 mm and the axial length is 79.5 mm.

Before processing the resin is dried in a Piovan® dryer (dew point between −45° C. and −55° C.) at 140° C. for 4 to 6 hrs.

The settings of the Arburg injection-molding machine 420 C 800-250 were as follows:

| Variable | typical values |
| --- | --- |
| heating zone 1 to 5 [° C.] | 270 to 290 |
| hot runner temperature [° C.] | 275 to 290 |
| nozzle temperature [° C.] | 290 to 320 |
| dosing time [sec] | 4 to 5 |
| melt cushion [mm] | 1.5 to 2.8 |
| leftover cooling time [sec] | 5 to 10 |
| back pressure [bar] | 20 to 50 |
| metering stroke [mm] | 30 to 40 |
| metering velocity [mm/sec] | 40 to 50 |
| hydraulic motor [bar] | 60 to 130 |
| injection time [sec] | 1.0 to 1.2 |
| maximum injection pressure [bar] | 600 to 1300 |
| pressure integral [bar*sec] | 300 to 700 |
| hold pressure time [sec] | 8 to 15 |
| change-over point [mm] | 5 to 15 |
| cycle time [sec] | 20 to 25 |
| room temperature [° C.] | between 20° C. and ≦36° C. |

Free blow process and NSR determination:

Parisons are marked with a rectangular area (hoop direction $[\text{hoop}_{parison}]=1.35$ cm, axial direction $[\text{axial}_{parison}]=2.00$ cm) on the outer surface. Before free blowing, the parisons are stored for 24 hrs at 20° C.

Parison reheating was performed on a Krupp-Corpoplast stretch blow-molding machine (LB 01®) with quartz near infrared heating elements. The overall heating capacity was set to 69%. The LB 01® has 6 heating zones and the following settings for each heating zone was used:

heating zone 1: 70 heating zone 2: 30 heating zone 3: 50 heating zone 4: 50 heating zone 5: 50 heating zone 6: 50

In order to obtain equilibrium in the infrared radiation, the lamps are heated for at least 6 hr prior to the first free blowing test. The distance of the quartz heating elements to each other is <25 mm and the distance of the quartz heating elements to the parison axis is <55 mm.

The parisons at 20° C. were heated with the infrared radiation typically for 12 to 18 seconds. After a traverse motion of the radiant heater and after a holding time of 15 seconds, the temperature of the parison is measured with a KT14P® sensor (Heimann GmbH, Germany). The distance of the sensor to the parison surface is between 14 to 15 cm and the temperature measurement was performed on the upper part of the parison (end cap is top). All free-blowing trials are performed with parisons with an apparent temperature between 84.5° C. and 85.0° C. measured with the KT14P® sensor. According to the indication translation table KT14P® from Krupp-Corpoplast (Apr. 24, 1987), the apparent temperature of 85.0° C. corresponds to actual 112.5° C.

Within 25 seconds, the heated parison (cooled at the parison end cap) is screwed onto a blowing apparatus. After 25 seconds the equilibrated parison is pressurized with 5 bar air. After 5 seconds, the valve to the pressure line is closed and the free blown bottle is cooled down on the outside with a wet woven fabric. In order to freeze the bubble size after blowing, the blow pressure is maintained until the pressure inside the bubble reaches 4 bar, then the pressure is released from the bubble.

The marked rectangular area on the surface of the bubble, which is now stretched, is measured to obtain the $hoop_{bottle}$ and the $axial_{bottle}$ lengths. The NSR is calculated according the following equation:

$$NSR=(hoop_{bottle}/hoop_{parison})*(axial_{bottle}/axial_{parison}).$$

Manufacture of PET

Batch Process

The details of the batchwise preparation of polyethylene terephthalate copolymer comprise two substeps:
 a) transesterification of dimethyl terephthalate and sodium dimethyl-5-sulfonatoisophthalate, using monoethylene glycol and
 b) polycondensation.

In each case the transesterification and the polycondensation is performed with approximately the same time parameters. Once the polycondensation was completed, the autoclave was cleaned using monoethylene glycol. The transesterification product is polycondensed in an autoclave. The amounts used, the method, and the other conditions are described below and summarized in Table 2.

The transesterification consists of the reaction of dimethyl terephthalate (DMT) and sodium dimethyl-5-sulfonatoisophthalate with monoethylene glycol (MEG) in the melt, using manganese-(II)-acetate tetrahydrate as a transesterification catalyst. The transesterification reaction is initiated at a temperature of 150° C. and is completed at 220° C. (product temperature).

Additive 2 (see Table 2) is dissolved in 290 ml monoethylene glycol, then 40 g sodium dimethyl-5-sulfonatoisophthalate (5-SIM) is added and the glycol is heated to 90° C. in order to obtain a clear solution.

2000 g dimethyl terephthalate (DMT), 910 ml Monoethylene glycol, the glycol solution of 5-SIM and 642 mg using manganese-(II)-acetate tetrahydrate are added. The composition is kept under nitrogen. Once the DMT has melted and the reaction has started, methanol is formed.

The transesterification product obtained is then stabilized by addition of a phosphorous compound (additive 1; see Table 2) and than polycondensed in an autoclave after addition of the polycondensation catalyst. The preferred stabilizer is disodium monohydrogenphosphate. The polycondensation catalyst is either $Sb_2O_3$ or a titanium containing catalyst like C94® or Hombifast PC®. The pressure is reduced to 0.3 mbar, and the temperature of the interior space is increased from 180° to 280° C. The reaction is continued with separation of monoethylene glycol (MEG) until the desired melt viscosity is achieved. The polymer is then pelletized.

Continuous Process

The continuous preparation of polyethylene terephthalate copolymer was performed in four sequentially connected vessels for transesterification and polycondensation. The amounts used, the method, and the other conditions are described below.

The transesterification consists of the reaction of dimethyl terephthalate (DMT) and sodium dimethyl-5-sulfonatoisophthalate with monoethylene glycol MEG in the melt, using manganese-(II)-acetate tetrahydrate as a transesterification catalyst. The transesterification reaction is initiated at a temperature of 180° C. and is completed at 240° C. (product temperature).

The DMT is added in liquid form. Additive 2 (see Table 3) is dissolved in monoethylene glycol then sodium dimethyl-5-sulfonatoisophthalate (5-SIM) is added and the glycol is heated to 90° C. in order to obtain a clear solution. As preferred additive 2, sodium acetate trihydrate is used. Monoethylene glycol, the glycol solution of 5-SIM and the transesterification catalyst are then added continuously. The transesterification composition is kept under nitrogen. The methanol and eventually the water formed during transesterification is distilled off.

The transesterification or esterification product obtained is then transferred to the second vessel, where a phosphorous compound as stabilizer and a polycondensation catalyst are added. Disodium monohydrogenphosphate is preferred as stabilizer. The pressure is reduced to 300 mbar in the second vessel and to 20 mbar and than 1 mbar in the following vessels. At the same time the temperature is increased from 240° to 285° C. The polymer obtained is then pelletized.

Table 1 shows the reproduction of example 1 of JP 59-093723 which does not contain any sodium dimethyl-5-sulfonatoisophthalate (Comparative Example 1) and with sodium dimethyl-5-sulfonatoisophthalate (Ex. 3) and example 1 of JP 59-093723 without $Na_2HPO_4$ (Ex. 2).

For better comparison, the NSR was not determined but calculated according the following formula: NSR=18.91+1.74*DEG−1.37*SIM−13.43*IV. DEG: diethylene glycol in wt-%; SIM: sodium dimethyl-5-sulfonatoisophthalate in wt-% (wt-% is based on the weight of the polyester). At best the NSR reached 10.9, which is still unsatisfactory.

Table 2 shows a comparative example "Batch 1" which represents a polyester with 1.3 mol-% of sodium dimethyl-5-sulfonatoisophthalate (5-SIM), with standard phosphor stabilizer. At best the NSR reached 10.1, which is still unsatisfactory.

Examples "Batch 2" to "Batch 5", which are examples according to the invention, are batch process examples using $Na_2HPO_4$ as stablizier and antimony trioxide as poly-condensation catalyst. Examples Batch 6 and Batch 7 were carried out using a titanium compound. Table 2 shows the composition of each sample, the DEG value, the IV, the NSR value and the half time of crystallization.

Table 3 shows examples "CP1" to "CP3" which are examples according to the invention. They were carried out on continuous line using $Na_2HPO_4 \times 12H_2O$ as stabilizer and antimony trioxide as poly-condensation catalyst. Table 3 shows the composition of each sample, the DEG value, the IV, the obtained NSR value and the half time of crystallization.

TABLE 1

Comparison with JP 59-093723

|  | Comp. Ex. 1 "Example 1" of JP 59-093723 | Ex. 2 | Ex. 3 |
|---|---|---|---|
| DMT | 2000 g | 2000 g | 2000 g |
| monoethylene glycol (MEG) | 1077 ml | 1077 ml | 787 ml |
| 5-SIM | 0 | 0 | 40 g |
| Na(ac) × 3H$_2$O | 0 | 0 | 1048 mg |
| Monoethylene glycol | 0 | 0 | 290 ml |
| Mn(ac)$_2$ × 4H$_2$O | 907 mg | 907 mg | 907 mg |
| Trimethyl phosphate | 1.08 g | 1.08 g | 1.08 g |
| NaH$_2$PO$_4$ × H$_2$O | 14 mg | 216 mg | 14 mg |
| Na$_2$HPO$_4$ × 7H$_2$O | 196 mg | 0 | 196 mg |
| TiO$_2$ (18 wt-% in MEG) | 33.33 g | 33.33 g | 33.33 g |
| Sb$_2$O$_3$ | 816 mg | 816 mg | 816 mg |
| DEG [wt-%] | 0.68 | 0.74 | 1.59 |
| IV [dl/g] | 0.687 | 0.607 | 0.547 |
| NSR | 10.9 | 11.9 | 11.6 |
| t$_{0.5}$ [sec] | 66.6 | 75.6 | 285.6 |

TABLE 2

Batch Trials

| | Batch 1 comparative | Batch 2 | Batch 3 | Batch 4 |
|---|---|---|---|---|
| DMT | 2000 g | 2000 g | 2000 g | 2000 g |
| Monoethylene glycol | 910 ml | 910 ml | 910 ml | 910 ml |
| 5-SIM | 40 g | 40 g | 40 g | 40 g |
| Additive 2 | 864 mg Na(ac) 3H$_2$O | 978 mg Li(ac) 2H$_2$O | 864 mg Na(ac) 3H$_2$O | 864 mg Na(ac) 3H$_2$O |
| Monoethylene glycol | 290 ml | 290 ml | 290 ml | 290 ml |
| Mn(ac)$_2$ × 4H$_2$O | 642 mg | 642 mg | 642 mg | 642 mg |
| Additive 1 | 3.8 g Polyphosphoric acid in MEG (5%) | 604 mg Na$_2$HPO$_4$ × 7H$_2$O | 604 mg Na$_2$HPO$_4$ × 7H$_2$O | 1730 mg Na$_2$HPO$_4$ × 7H$_2$O |
| PC-Catalyst | 831 mg Sb$_2$O$_3$ | 831 mg Sb$_2$O$_3$ | 831 mg Sb$_2$O$_3$ | 831 mg Sb$_2$O$_3$ |
| DEG [wt-%] | 1.28 | 0.7 | 0.8 | 0.84 |
| IV [dl/g] | 0.619 | 0.595 | 0.636 | 0.629 |
| NSR | 10.1 | 9.5 | 9.2 | 9.3 |
| $t_{0.5}$ [sec] | 443.4 | 343.2 | 450.6 | 491.4 |

| | Batch 5 | Batch 6 | Batch 7 |
|---|---|---|---|
| DMT | 2000 g | 2000 g | 2000 g |
| Monoethylene glycol | 910 ml | 910 ml | 910 ml |
| 5-SIM | 40 g | 40 g | 40 g |
| Additive 2 | 864 mg Na(ac) 3H$_2$O | 864 mg Na(ac) 3H$_2$O | 864 mg Na(ac) 3H$_2$O |
| Monoethylene glycol | 290 ml | 290 ml | 290 ml |
| Mn(ac)$_2$ × 4H$_2$O | 642 mg | 642 mg | 642 mg |
| Additive 1 | 736 mg K$_2$HPO$_4$ × 7H$_2$O | 467 mg Na$_2$HPO$_4$ × 7H$_2$O | 467 mg Na$_2$HPO$_4$ × 7H$_2$O |
| PC-Catalyst | 831 mg Sb$_2$O$_3$ | 37 mg (10 ppm Ti) C94 ® | 126.6 mg (10 ppm Ti) Hombifast PC ® |
| DEG [wt-%] | 0.86 | 0.82 | 0.75 |
| IV [dl/g] | 0.639 | 0.623 | 0.615 |
| NSR | 9.2 | 9.4 | 9.4 |
| $t_{0.5}$ [sec] | 366.0 | 276.0 | 243.0 |

TABLE 3

Continuous Polymerization Trials:

| | CP 1 | CP 2 | CP 3 |
|---|---|---|---|
| PET [kg/h] | 44 | 44 | 44 |
| 5-SIM [wt-%] | 2.0 | 2.0 | 1.0 |
| Na(ac) × 3H$_2$O [ppm] | 524 | 524 | 524 |
| Mn(ac)$_2$ × 4H$_2$O [ppm] | 321 | 321 | 321 |
| Na$_2$HPO$_4$ × 12H$_2$O [ppm] | 405 | 405 | 405 |
| Sb$_2$O$_3$ [ppm] | 429 | 429 | 429 |
| DEG [wt-%] | 1.53 | 1.75 | 1.45 |
| IV [dl/g] | 0.804 | 0.799 | 0.848 |
| NSR | 8.2 | 8.6 | 8.8 |
| $t_{0.5}$ [sec] | 510 | 588 | 558 |

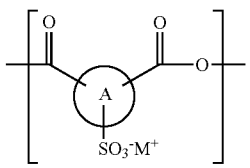

(I)

wherein

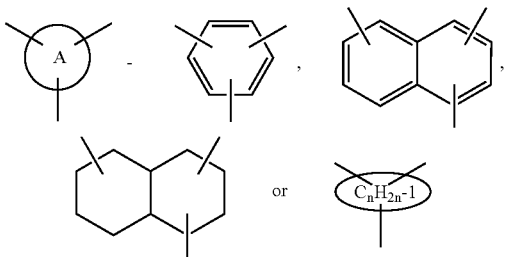

The invention claimed is:

1. Polyester resin comprising at least 85 Mol-% of polyethylene terephthalate and at least 0.01 Mol-%, but not more than 5.00 Mol-% of units of the formula (I)

wherein n is an integer from 3 to 10 and
wherein $M^+$ is an alkali metal ion, earth alkali metal ion, phosphonium ion or ammonium ion and wherein the polyester contains <5.0 wt.-% of diethylene glycol and wherein the polyester contains $Na_2HPO_4$ in an amount such that the phosphor content is 10 to 200 ppm (based on the weight of the polyester) and wherein the polyester is either free of or does not contain more than 9 ppm of $NaH_2PO_4$, and wherein the intrinsic viscosity is 0.6 to 1.0.

2. Polyester resin according to claim 1, wherein

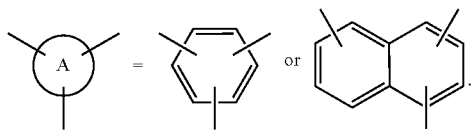

3. Polyester resin according to claim 1, wherein

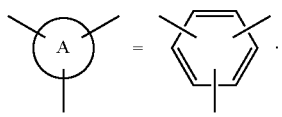

4. Polyester resin according to claim 2, wherein the attachments to the phenyl ring are in 1-, 3- and 5-position and the attachment to the naphthyl ring are in 2-, 4- and 6-position.

5. Polyester resin according to claim 1, wherein $M^+$ is $Li^+$, $Na^+$ or $K^+$.

6. Polyester resin according to claim 1, wherein the $Na_2HPO_4$ (disodium monohydrogenphosphate) is in the form of the dodeca-hydrate (.12 $H_2O$).

7. Polyester resin according to claim 1, further comprising <10 Mol-% of modifying agents.

8. Polyester resin according to claim 1, wherein the NSR is <10.

9. Polyester resin according to claim 1, wherein the half time of crystallization is <150 sec at 200° C.

10. Method of manufacturing a polyester resin according to claim 1, comprising the steps of
a) reacting terephthalic acid (TA) or $C_1$-$C_4$-dialkyl terephthalate; and ethylene glycol (EG); and at least 0.01, but not more than 5.00 Mol-% of a compound according to formula (II):

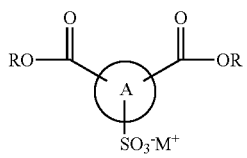

wherein R is hydrogen, a $C_1$-$C_4$-alkyl or a $C_1$-$C_4$-hydroxyalkyl and M and

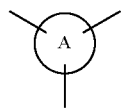

have the meaning given in claim I for formula (I) and
b) subjecting the reaction product of a) to a polycondensation reaction to form the polymer.

11. The method according to claim 10, wherein

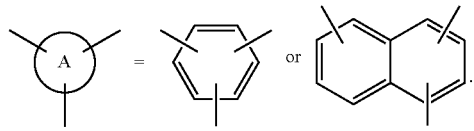

12. The method according to claim 10, wherein

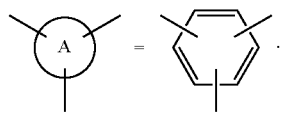

13. The method according to claim 11, wherein the attachments to the phenyl ring are in 1-, 3- and 5-position and the attachment to the naphthyl ring are in 2-, 4- and 6-position.

14. The method according to claim 11, wherein the polyester contains $Na_2HPO_4$ in an amount such that the phosphor content is 10 to 200 ppm (based on the weight of the polyester).

15. The method according to claim 11, wherein the polyester contains <2.5 wt.-% of diethylene glycol.

16. The method according to claim 11, wherein the polyester contains $Na_2HPO_4$ in an amount such that the phosphor content is 10 to 200 ppm (based on the weight of the polyester) and wherein the polyester contains <2.5 wt.-% of diethylene glycol.

17. Polyester resin according to claim 1, wherein the polyester contains $Na_2HPO_4$ in an amount such that the phosphor content is 10 to 200 ppm (based on the weight of the polyester).

18. Polyester resin according to claim 1, wherein the polyester contains <2.5 wt-% of diethylene glycol.

19. Polyester resin according to claim 1, wherein the polyester contains $Na_2HPO_4$ in an amount such that the phosphor content is 10 to 200 ppm (based on the weight of the polyester) and wherein the polyester contains <2.5 wt.-% of diethylene glycol.

* * * * *

UNITED STATES PATENT AND TRADEMARK OFFICE
CERTIFICATE OF CORRECTION

PATENT NO.       : 7,473,755 B2
APPLICATION NO.  : 10/583806
DATED            : January 6, 2009
INVENTOR(S)      : Uwe Bayer et al.

It is certified that error appears in the above-identified patent and that said Letters Patent is hereby corrected as shown below:

Claim 1, column 14, line 56 replace the formula

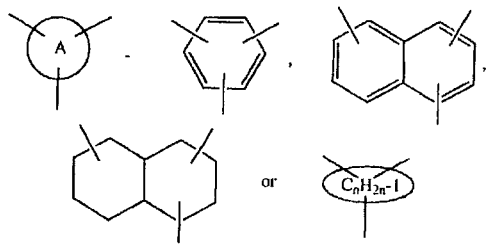

with

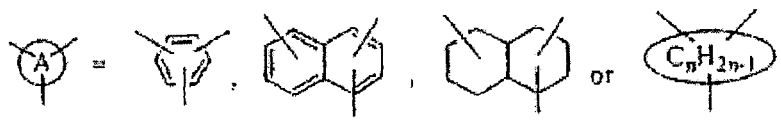

Claim 9, column 15, delete "<150 sec" and replace with -- >150 sec --.

Signed and Sealed this
Ninth Day of August, 2011

David J. Kappos
*Director of the United States Patent and Trademark Office*